Feb. 21, 1956
J. A. W. MADSEN
2,735,689
CHUCK MECHANISM
Filed Nov. 1, 1952
4 Sheets-Sheet 2
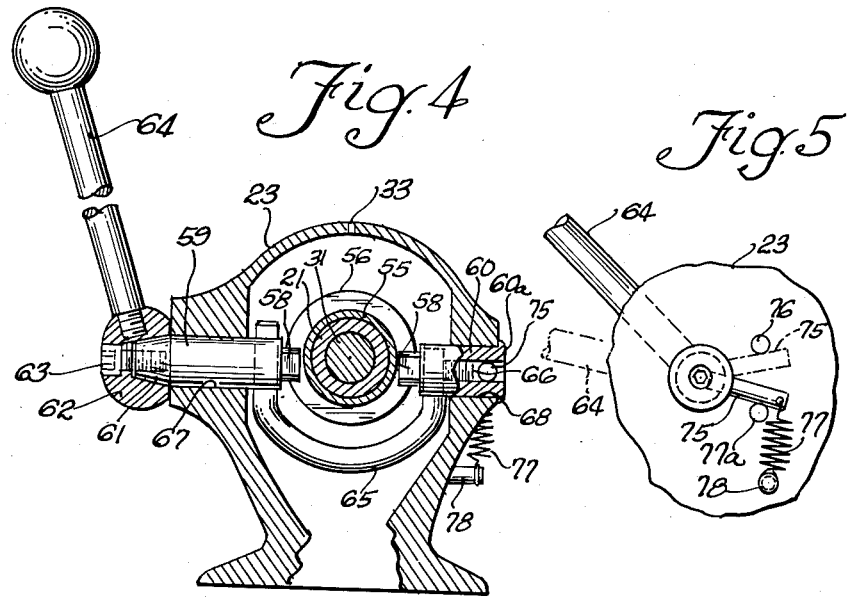
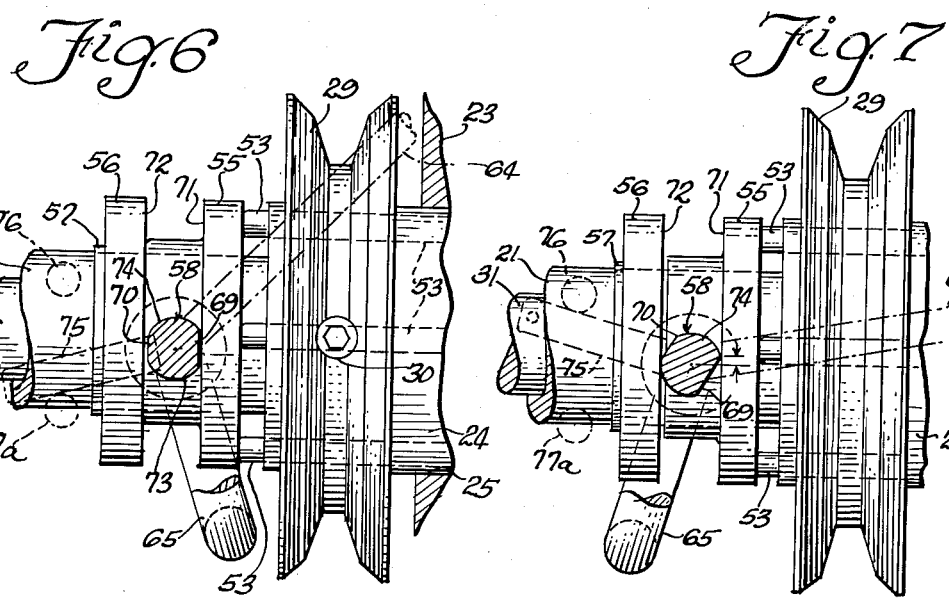
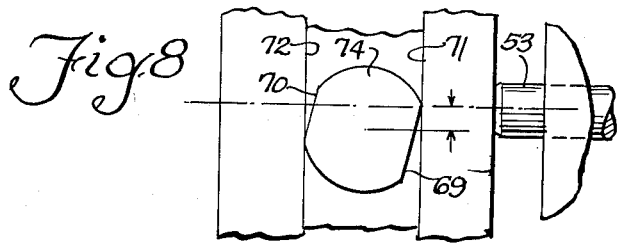
INVENTOR.
Jens Axel W. Madsen
BY
Attorney

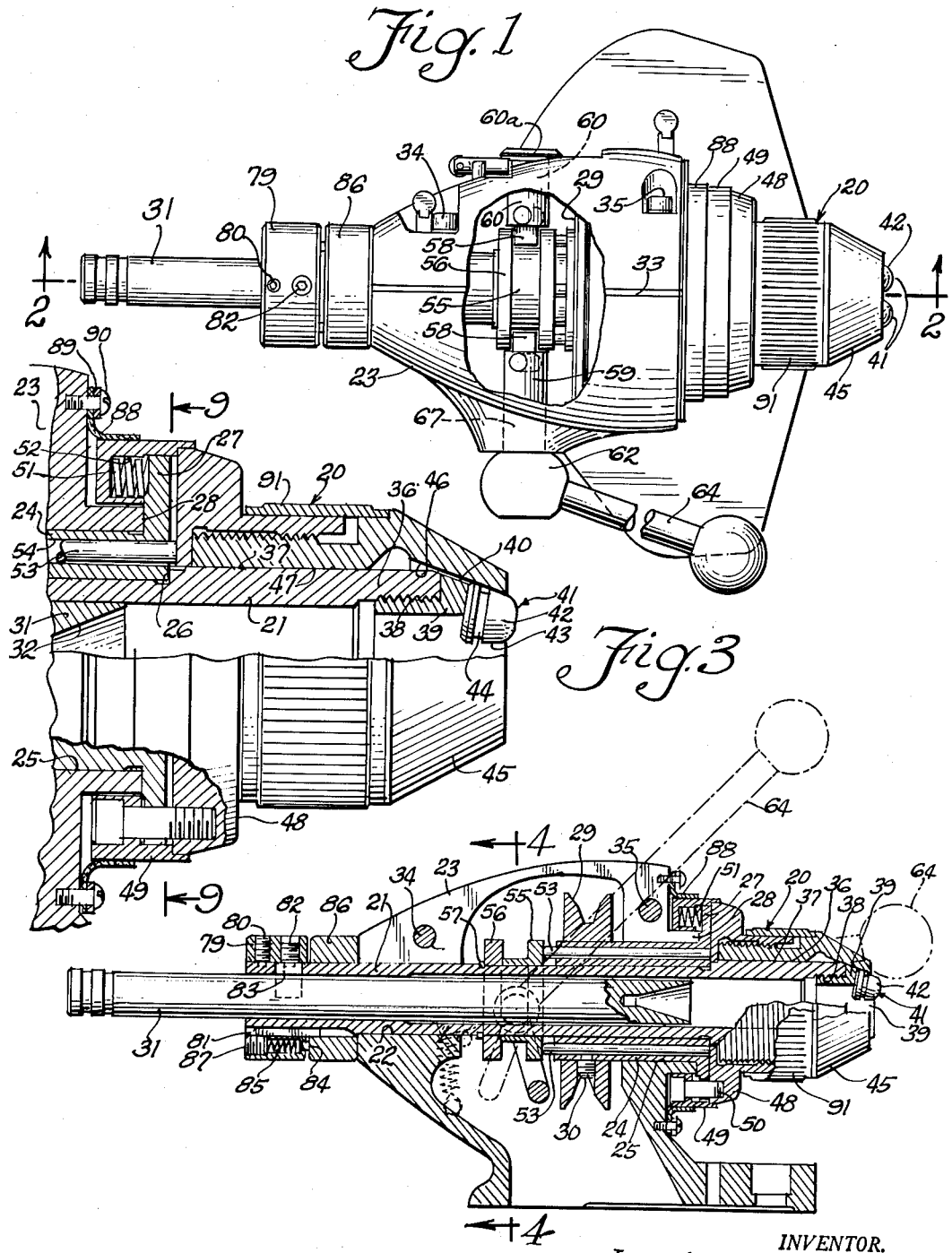

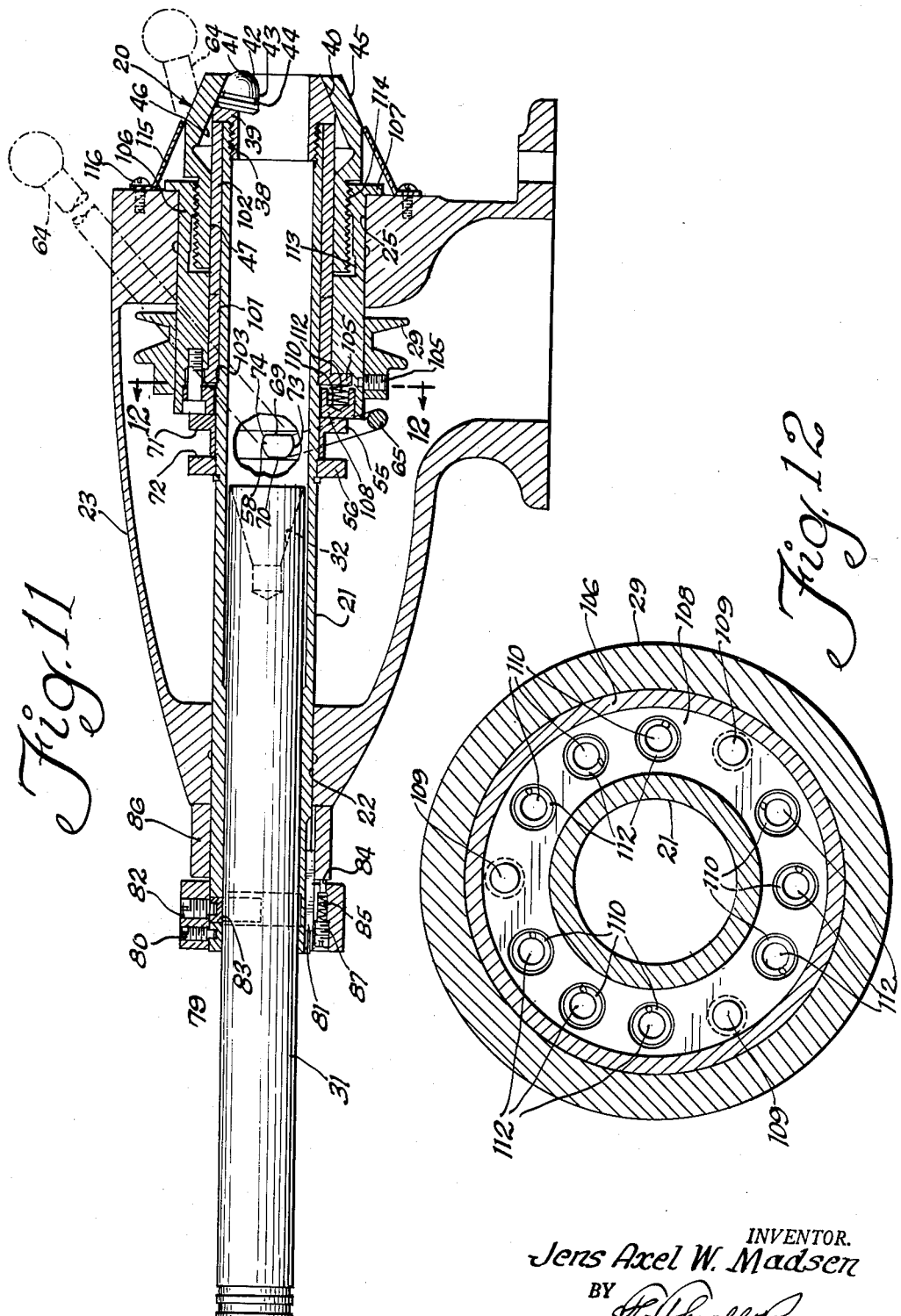

Feb. 21, 1956 J. A. W. MADSEN 2,735,689
CHUCK MECHANISM
Filed Nov. 1, 1952 4 Sheets-Sheet 4

INVENTOR.
Jens Axel W. Madsen
BY
Attorney

United States Patent Office 2,735,689
Patented Feb. 21, 1956

2,735,689

CHUCK MECHANISM

Jens Axel W. Madsen, Sioux City, Iowa, assignor to Albertson & Company, Inc., Sioux City, Iowa, a corporation of Iowa Application November 1, 1952, Serial No. 318,180

16 Claims. (Cl. 279—74)

This invention relates generally to chuck mechanisms adapted to the gripping and centering of workpieces, and suited to use on machines such, for example, as those used for grinding operations.

A general object of this invention is to provide a chuck adapted for quick opening and closing movements effected by a control element requiring only one hand of an operator and a simple operation. By requiring only one hand of the operator for opening and closing of the chuck, the operator's other hand is free for handling workpieces and for positioning them in the chuck.

It is another object of this invention to provide a chuck structure in which the forces for opening and closing the chuck are not transmitted through the chuck spindle.

My invention also has within its purview the provision of a control structure for opening and closing a chuck, which control structure avoids binding with respect to parts of the chuck mechanism including the spindle upon which it is mounted.

Another object of my invention is the provision of a control structure for effecting opening and closing movements of a chuck mechanism, which control structure includes members mounted on the chuck spindle and cams acting against those members to open the chuck. The arrangement is such that the cams are normally out of contact with the members when the chuck is closed to grip a workpiece, and while such members, mounted on the chuck spindle, rotate therewith.

This invention further comprehends the provision of a control structure for opening and closing a chuck, which control structure includes an angularly shiftable cam constructed and arranged with respect to a member against which it operates so that the cam cannot get into a self-locked position.

Another object of the invention is the provision of a chuck mounted for rotation with a spindle, and means for compensating for wear that may occur axially of the rotating spindle.

Other objects and advantages of the invention will be apparent from the following description and the accompanying drawings in which similar characters of reference indicate similar parts throughout the several views.

Referring to the four sheets of drawings:

Fig. 1 is a top plan view, with parts broken away, of a preferred embodiment of the chuck mechanism of this invention wherein the chuck mechanism is shown in an adaptation to a machine for use in grinding operations and the like;

Fig. 2 is a side sectional view of the chuck shown in Fig. 1 wherein the section is taken substantially on a line 2—2 in Fig. 1, and in the direction of the arrows, with portions of the structure shown in elevation;

Fig. 3 is a fragmentary side view, partly in section, of a portion of the structure shown in Fig. 2, but with certain parts in positions different from those depicted in Fig. 2;

Fig 4 is a transverse sectional view taken substantially on a line 4—4 in Fig. 2, and in the direction of the arrows;

Fig. 5 is a fragmentary side view showing a lever for operating the chuck and a spring for balancing the lever;

Fig. 6 is a fragmentary side view of a portion of the structure of Figs. 1 and 2, showing structural details of a controller for releasing the chuck, the control structure being shown in its normal position of rest;

Fig. 7 is a view similar to Fig. 6, but showing the control structure in position to start the release of the chuck;

Fig. 8 is a view similar to Fig. 6, but showing the position of the controller when the chuck is fully released;

Fig. 11 is a side sectional view, similar to Fig. 2, illustrating a modification of my invention; and Fig. 12 is an end sectional view taken substantially on a line 12—12 of Fig. 11 and viewed in the direction indicated by arrows.

Figure 9:
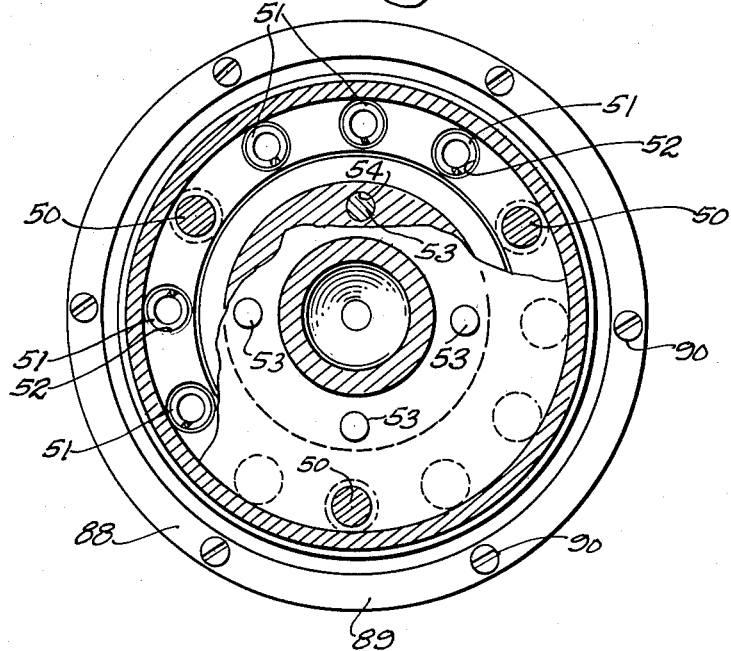
Fig. 9 is an end sectional view taken substantially on a line 9—9 in Fig. 3 and in the direction of the arrows.

Although the chuck structure disclosed herein is suited to many and various adaptations and uses wherein chucks are utilized for the holding and/or centering of various work pieces, tools, and the like, the illustrative embodiments of my invention which are disclosed herein for exemplary purposes are applied to a machine of the bench type suited for grinding valves and the like. In its general association for the disclosed purpose, and as shown in Figs. 1 and 2, a chuck 20 is mounted at one end of a hollow spindle 21, which is supported for rotation in a journal bearing 22 in a housing 23.

A sleeve 24 is secured, as by shrinking, to the exterior of the spindle 21 and is mounted for rotation in a bearing 25 in the housing 23 in spaced relationship to the bearing 22 axially of the spindle. One end of the sleeve 24 abuts a shoulder 26 on the spindle 21 and has a flange 27 extending outwardly in a radial direction. The flange 27 abuts an annular end portion 28 on the housing 23 adjacent the bearing 25. A pulley 29 through which the spindle 21 is driven is secured to the sleeve 24 by fastening means such as set screw 30 (Fig. 2) and is adapted to receive its driving force from a prime mover, not shown, through a flexible driving element, such as a V-type belt, not shown. The spindle 21 has a centering device 31 mounted therein for adjustment to selected positions axially of the spindle, and extends from the end of the spindle away from the chuck. The centering device 31 has a conical end bore 32, as shown in Figs. 2 and 3.

The journal bearings 22 and 25 in the housing 23 are preferably adjustable within limits by varying the thickness of shims, such as 33, at one side of the bearings and the adjustment cap screws 34 and 35 to compensate for wear.

Considering the structure of the disclosed chuck in greater detail, it is by preference that the chuck end of the spindle 21 has a diametrically enlarged portion 36 on the outside of which is a substantially cylindrical bearing surface 37 and which is internally counter-bored and threaded at 38 to receive a metal insert or nose-piece 39. Adjacent portions of the enlarged spindle end portion 36 and the outer surface of the nose-piece 39 are shaped to provide a conical outer surface 40 (Fig. 3). In its outer end, the nose-piece 39 has a number of radial slots, greater than two, which open endwise of the nose-piece and are desirably spaced circumferentially of the nose-piece.

In the disclosed embodiment of my invention, the slots in the nose-piece 39 are dovetailed in shaped, wider at their base than at their open ends and receive gripping elements 41 for sliding movement therein radially of the spindle. As shown in Figs. 1, 2 and 3, the gripping elements utilized have substantial spherical end gripping portions 42 which project from the slots in the nose-piece 39 and have tapered side portions 43 which are retained within the slots. Also, the gripping elements preferably have circumferential grooves 44 therein near the bases thereof. With the type of gripping elements disclosed, and when the diameter of the spindle opening is large as compared to the diameters of the gripping elements, it is further desirable that the slots in the nose-piece 39 taper radially so that their inner ends are sufficiently narrow to retain the gripping elements and prevent their movement radially into the spindle opening when there is no workpiece in the chuck.

A chuck sleeve 45 is mounted for axial and rotational movements on the enlarged end portion 36 of the spindle 21 and has an internal conical surface 46 (Fig. 3) conforming substantially to the external conical surface 40 on the spindle end and the nose-piece 39 for determining the positions of the gripping elements 41 and applying the gripping force thereto. The sleeve 45 has an internal cylindrical surface 47 (Fig. 3) adapted to fit and move relative to the cylindrical bearing surface 37 on the enlarged end portion 36 of the spindle 21. The end of the chuck sleeve 45 away from the internal conical surface 46 has an external thread in engagement with an internal thread on a chuck collar 48.

As shown in Figs. 2 and 3, a ring 49 is secured to the chuck collar by screws 50 which extend through the flange 27 of the sleeve 24 and are threaded into the chuck collar 48. The screws 50 are preferably equally spaced circumferentially of the chuck collar, and in the disclosed structure there are three, as indicated in Fig. 9. A plurality of pressure springs 51 are mounted in recesses 52 in the ring 49 which springs urge the collar 48 against the flange 27, as indicated in Fig. 2. The collar 48 may move axially of the spindle 21 with respect to the flange 27 against the action of the springs 51 so as to be spaced from the flange 27, as shown in Fig. 3. This is possible because of the provision of a suitable space between ring 49 and the chuck collar 48. As shown in Fig. 9, the disclosed structure utilizes nine springs 51 which are symmetrically arranged in a circle with a screw 50 positioned between each set of three springs 51.

When the chuck collar 48 is moved away from the flange 27, as depicted in Fig. 3, the chuck sleeve is also moved to space its conical surface 46 from the conical surface 40 on the nose-piece 39, whereby the gripping elements 41 are released for outward movement. Such movement of the chuck collar 48 to the position of Fig. 3 is effected by axial movements of a plurality of push rods 53 which are mounted for linear movements in axially extending openings 54 in the sleeve 24. In the disclosed structure, there are four push rods which are equally spaced circumferentially, as depicted in Fig. 9. The rods are longer than the sleeve bearing 24 and are engaged at their ends away from the chuck collar 48 by a flanged ring 55 which is mounted on the spindle 21 for movements axially thereof. In the position of Figs. 2 and 6, the flanged ring 55 engages a stationary ring 56, which is stationary in the sense of being prevented from moving in one direction along the spindle 21 by a retainer 57 set in the spindle and from moving in the opposite direction along the spindle by the movable ring 55.

As shown in Figs. 1 and 4, a pair of substantially identical and coaxially aligned cams 58 project into the space between the abutting flanged ring 55 and stationary ring 56. One of the cams is secured to the inner end of a trunnion 59, and the other to the inner end of a trunnion 60. The outer end of the trunnion 59 is shaped to provide a frusto-conical surface 61 which is engaged by a conical bore in a block 62 which is secured to the trunnion 59 by fastening means, such as a screw 63. A manually operable hand lever 64 is threaded into the block 62. The ends of a substantially U-shaped yoke 65 extend through transverse bores in the inner ends of the trunnions 59 and 60 to interconnect the cams 58 for conjoint movement. A set screw 66 (Fig. 4) threaded into the trunnion 60 engages the leg of the yoke in that trunnion to hold the yoke in place in the trunnions. The trunnions 59 and 60 are held against axial movement in thickened bearing portions 67 and 68 in the casing 23 by engagement of the block 62 with the outer side of the bearing portion 67 and by engagement of an enlarged bead or flange 60a on the trunnion 60 with the outer end surface of the bearing portion 68.

The trunnions 59 and 60 are aligned and provide a common axis about which the cams 58 move angularly. This axis is somewhat displaced from intersecting relationship with the axis of the spindle 21 in order to establish an advantageous action line for the forces of the cams in their operation. Each cam has opposed parallel flat portions 69 and 70 which are spaced from one another laterally of the cam axis a distance slightly less than the normal space between the facing surfaces 71 and 72 on rings 55 and 56 when those rings are in contact, as depicted in Figs. 1 and 2. The axis of the cams is appropriately positioned between the facing surfaces 71 and 72 so that when the cams are disposed as indicated in Figs. 2 and 6, there is no contact between the cams and the rings 55 and 56. The flat portions 69 and 70 are connected at one end by an arcuate portion 73 which is centered on the cam axis and has a radius equal to the distance between the cam axis and the face 72 of the stationary ring 56. Thus when the cams 58 are moved angularly to the positions of Figs. 7 and 8 to cause the movable ring 55 to displace the push rods 53 and make them move the chuck collar 48 and chuck sleeve 45 to the position of Fig. 3, the cams are solidly backed by the stationary ring 56, but do not effect any displacement of the ring 56.

The flat portions 69 and 70 of each cam 58 are joined on the side opposite the arcuate surface 73, by a curved portion 74 which increases in radius from the juncture of the flat portion 69 and the curved portion 74 toward the juncture of the flat portion 70 and the curved portion 74. Thus the curved portions 74, upon rotation of the cams, are enabled with the ring surface 71 to shift the movable ring 55 away from the stationary ring, as indicated in Fig. 8. As depicted in Fig. 7, the juncture of the flat portion 69 and the curved portion 74 for one cam 58 contacts the face 71 of the movable ring 55 at a point diametrically opposed to the point contacted by the corresponding juncture for the other cam 58; that is, diametrically opposed with respect to the axis of the spindle 21. Thus, the movable ring 55 will not bind on the spindle 21 as a result of unbalanced and off-center forces as it begins to move along the spindle.

The extreme position to which the cams 58 can be angularly moved is depicted in Fig. 7. This position, as shown in Fig. 5, is determined by engagement of an arm 75, which is threaded into the trunnion 60, with a stop 76 secured to and projecting from the housing 23. In this position, the junctures of the straight portions 69 and the curved portions 74 of the cams 58 lie between parallel planes containing the cam axis and the spindle axis. Thus the cams cannot reach an over-center or locked condition, but will return to the position of Fig. 6 under the influence of a spring 77 (Figs. 4 and 5) connected to the arm 75 and a stud 78 on the housing 23, when the lever 64 is released. The spring 77 counterbalances the weight of the lever 64 and holds the arm 75 against a stop 77a when the lever 64 is released, so that the cams 58 are normally positioned, as shown in Fig. 6, free of engagement with the rings 55 and 56.

Referring to Figs. 1 and 2, the end of the spindle 21 away from the chuck 20 carries a collar 79 which is secured to the spindle by fastening means, such as a set screw 80 and a key 81. The collar 79 also carries a set screw 82 which is movable against the outer surface of a segment 83 located in a slot in the spindle 21. Movement of the set screw 83 against the segment fixes the position of the centering device 31 axially of the spindle, thereby to set the centering device for receiving workpieces of a certain length.

The collar 79 carries a plurality of headed members 84 in axial bores which are preferably spaced equally about the periphery of the spindle 21. In the disclosed structure, three such headed members are used. Each headed member 84 protrudes from the collar 79 and is urged by a spring 85 in the collar 79 against one end of a thrust collar 86; the other end of the thrust collar, in turn, is urged against the end of the housing 23 at the bearing 22, and is caused to rotate with the spindle 21 by the key 81. Set screws 87 threaded into the ends of the bores in the collar 79 retain each spring 85 in the collar 79 and against the headed member 84. The pressure of the springs against members 84 is transmitted through the spindle 21 to maintain the flange 27 on the sleeve 24 tight against the annular shoulder 28 on the housing 23. Even though wear may occur between the flange 27 and the annular shoulder 28 or between the thrust collar 86 and the end of the housing 23 at the bearing 22, the spring-urged members 84 maintain contact at the aforesaid regions.

A flexible annular seal 88 engages the periphery of the ring 49 to prevent the entrance of foreign matter between the ring 49 and the housing 23. The seal is held in place by a retaining ring 89 and screws 90 going through the seal and the ring and threaded into the housing 23.

A grooved or knurled sleeve 91 is secured to the chuck sleeve 45 and extends over a portion of the chuck collar 48. This knurled sleeve provides a grip which enables the chuck sleeve to be adjusted along the spindle 21 with respect to the chuck collar by rotation of the chuck sleeve relative to the chuck collar. The sleeve 91 also serves to protect the portions of the chuck which are in threaded engagement with one another.

In operation of the disclosed chuck, the chuck sleeve 45 is adjusted with respect to the chuck collar 48 by effecting manual rotation of the sleeve 91 as aforesaid. To set the chuck for machining workpieces such as valves of a given stem size, the chuck sleeve is turned to open the gripping elements to an extent allowing the stem of one of such valves to be inserted through the gripping elements 41 and into the spindle 21 until the end of the valve stem engages the conical end bore 32 in the centering device 31 while the cams 58 are in the normal position depicted in Fig. 6. The chuck sleeve 45 is then turned to adjust it to a position such that the valve stem is contacted by the gripping elements 41. Next, the chuck is opened or released by movement of the lever 64 to a position which turns the cams 58 angularly from the position of Fig. 6 to that of Fig. 8. Such movement of the cams effects movement of the movable ring 55 axially of the spindle and pushes rods 53 to effect corresponding linear movement of the chuck collar 48 and chuck sleeve 45, thereby separating the conical surface 46 from the conical surface 40 to release the gripping elements of the chuck. The initially inserted valve is then removed from the chuck. As a second phase of initial adjustment, the chuck sleeve 45 is turned a small amount in the tightening direction, say one-eighth of a revolution or about 45 degrees, relative to the chuck collar 48. These preliminary steps having been taken, the chuck is adjusted for firmly gripping valves with stems of approximately a given size, when the chuck is operated by movements of the hand lever 64 and cams 58. The chuck may be released with only one hand acting on the lever 64, so that the other hand is free for use to insert or remove valves therefrom.

The mechanical advantages of the cam-operated chuck release mechanism and the actuating surface for the gripping elements are such that powerful gripping action can be acquired from the force of the springs 51, without rendering the chuck difficult to operate by the hand lever.

Figure 10:
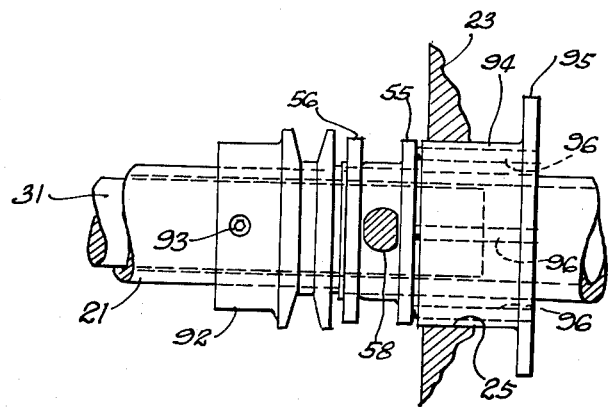
Fig. 10 is a fragmentary side view showing a modified form of control structure for the chuck.

The modified form of the invention illustrated in Fig. 10 differs from that described in that a driving pulley 92 is mounted directly on the hollow spindle, rather than on the sleeve 24, and serves as a stop for the stationary collar 56. The pulley 92 is secured to the spindle by fastening means, such as the set screw 93. Since the driving pulley is not mounted on the sleeve, a sleeve 94 is utilized which is appreciably shorter than the sleeve 24 of the previously described form. It has an outwardly extending radial flange 95 corresponding to the flange 27 in the described form. Push rods 96 mounted in the sleeve 94 are slightly longer than the sleeve 94 and are also appreciably shorter than the push rods 53. Cams 58, like cams 58 in the previous form, are positioned between stationary ring 56 and movable ring 55 at generally diametrically opposed positions with respect to the spindle and operate in the manner prescribed for the intitially described form. Conjoint angular movement of the cams, as described, causes the movable ring 55 to shift the push rods in the sleeve 94, and release of the chuck.

The modified form of my invention which is depicted in Figs. 11 and 12 functions in a manner quite similar to the forms previously described and embodies comparable parts referred to by reference numerals corresponding to those previously utilized. In this form, however, the chuck actuating mechanism which is responsive to movements of the hand lever 64 is somewhat changed by alterations of the structure and arrangement of parts embodied therein. On the other hand, and like the previously described forms, the chuck 20 embodies gripping elements 41 which are carried for radial movements in circumferentially spaced slots of a nose-piece 39 and controlled in their movements between gripping and non-gripping positions by linear movements of the conical internal surface of the chuck sleeve 45. Additionally, the structures of the lever actuated cams 58 and the movable and fixed rings 55 and 56 respectively, as well as the yoke 65, are the same as those parts of the previously described forms.

In the structure of Figs. 11 and 12, co-axial inner sleeves 101 and 102 are secured in abutting relationship to the exterior surface of the spindle 21 and are located between a shoulder 103 and a flange 104 on the nose-piece 39. The sleeve 101 has a radial flange 105 projecting outwardly from the inner end thereof which is adjacent the shoulder 103 on the spindle. The chuck sleeve 45 is supported for linear and rotational movements on the exterior surface of the sleeve 102. Also, an outer bearing sleeve 106 is mounted on the exterior surfaces of the inner sleeves 101 and 102 between the flange 105 and the inner end of the chuck sleeve 45. That outer bearing sleeve is supported for rotation in the bearing 25 of the housing and has a radial flange 107 which abuts the end surface of the housing to locate the sleeve relative thereto. The driving pulley 29 is secured to the external surface of the outer bearing sleeve 106, within the housing 23, by the set screw 30.

A ring 108 is secured to the inner end of the outer bearing sleeve 106, opposite the chuck sleeve 45, by a plurality of fastening elements such as screws 109. In the disclosed embodiment, three such screws are utilized in equally spaced relationship. The screws 109 extend through appropriate bores in the ring 108 and through openings in the flange 105 of the inner sleeve 101, and are threaded into the outer bearing sleeve 106. Preferably, the heads of the screws 109 are countersunk, so that the end surface of the movable ring 55 opposite the fixed ring 56 abuts the adjacent end surface of the ring 108. A plurality of recesses 110 are provided on the side of the ring 108 opposite the movable ring 55, which recesses carry compression springs 112. In the present instance, nine such compression springs are utilized and they are disposed in groups between the screws 109, as shown in Fig. 12. The screws 109 being movable linearly within the openings through the flange 105 in the inner sleeve 101, the cumulative force of the springs 112 normally urges the ring 108 away from the adjacent end surface of that flange 105 and biases the movable ring 55 into contact with the fixed ring 56. Thus, there is normally some space provided between the end surface of the ring 108 and the adjacent end surface of the flange 105, this space being allowed for movement of the ring 108 toward the flange 105 in response to forces applied to the movable ring 55 by actuation of the hand lever 64 and the action of the cams 58.

At the end of the outer bearing sleeve 106 opposite the ring 108, the chuck sleeve is threaded into an end recess 113, whereby the chuck sleeve may be initially adjusted relative to the nose-piece 39 and gripping elements 41 by turning of the chuck sleeve while the spindle is held stationary. After such preliminary adjustment, as previously described in connection with the other forms of the invention, the gripping elements 41 can be moved between predetermined limits by operating the hand lever 64. Such movements of the hand lever 64 rotate the cams 58 to move the movable ring 55 and such movements of the movable ring 55 are transmitted through the ring 108 and screws 109 to the outer bearing sleeve 106, in the outer end of which the chuck sleeve 45 is threadedly attached for movement therewith. A frusto-conical apron 115 is secured to the end of the housing 23 adjacent the chuck 20 by fastening means such as screws 116, and extends over the flange 107 on the outer bearing sleeve 106 and into closely spaced relationship to the chuck 20 to prevent dirt from getting into the operating parts of the chuck actuating mechanism.

While I have illustrated preferred embodiments of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. A chuck mechanism comprising a hollow spindle, a nose-piece mounted in one end of the spindle and projecting axially therefrom, said nose-piece having slots in the projecting end thereof which extend radially of the axis of the spindle, gripping elements mounted in said slots for movements radially of the spindle axis, a chuck sleeve mounted on the exterior of the spindle adjacent the said one end thereof and having an internal conical surface for engagement with said gripping elements to control the positions thereof radially of the spindle axis, a collar threaded onto the chuck sleeve, a sleeve bearing fixed to the exterior of the spindle and having a flange at one end thereof, a ring secured to the collar, the ring and the collar loosely receiving the flange of the sleeve bearing between them, springs mounted in the ring to force the collar and flange together, the sleeve bearing having a plurality of axially extending openings therein, a plurality of push rods mounted for linear movements in said openings and being longer than the sleeve bearing, one end of each push rod engaging the chuck sleeve and the other end projecting beyond the end of the sleeve bearing opposite the end at which the flange is located, and actuating means including a hand lever for applying force against the projecting end of each push rod to cause the push rods to move the collar and the chuck sleeve axially of the spindle against the action of the springs in said ring, whereby the internal conical surface on the chuck sleeve is shifted with respect to the gripping elements so that the gripping elements may move radially outwardly.

2. A chuck mechanism comprising a hollow spindle, gripping means mounted at one end of the spindle, a chuck sleeve mounted on the hollow spindle at the said one end so as to be shiftable axially of the spindle for effecting control of the action of the gripping means, a collar threaded onto the chuck sleeve, a ring secured to the collar, a sleeve bearing fixed to the spindle and having a flange at one end loosely received between the ring and the collar, springs acting between the flange and the ring to urge the collar against the flange, the ring serving as a retainer for the springs, the sleeve bearing having a plurality of axially extending openings therein, a plurality of push rods mounted in said openings for linear movements and being longer than the sleeve bearing so as to engage the collar at one end and project beyond the end of the sleeve bearing opposite the end where the flange and the collar are located, and a controller acting against the ends of the push rods beyond the said opposite end of the sleeve bearing to shift the push rods axially of the spindle and make the push rods push the collar and the chuck sleeve axially of the spindle against the action of the springs, whereby the gripping means is released.

3. A combination as specified in claim 2, and wherein the controller comprises a fixed ring mounted on the spindle, a movable ring mounted on the spindle between the fixed ring and the projecting ends of the push rods, a pair of cams projecting between the rings at generally diametrically opposed positions, a yoke connecting the cams, and a lever arm for rotating the cams to shift the movable ring against the projecting ends of the rods so as thereby to cause the push rods to be shifted axially of the spindle.

4. A combination as specified in claim 3, and further comprising a housing having spaced and coaxial bearing openings therein, one of said spaced bearing openings having the sleeve bearing mounted therein, the other of said spaced bearing openings having the hollow spindle journalled therein adjacent the end of the spindle opposite the end in which the gripping means are mounted, means mounting the cams in the housing for angular movement about an axis spaced a predetermined distance from the adjacent side of the fixed ring, and each cam having a curved portion centered on the said cam axis and having a constant radius equal to the said predetermined distance, whereby contact is made between the said adjacent side of the fixed ring and the said curved portions of the cams during angular movement of the cams to shift the movable ring.

5. A combination as specified in claim 4, and wherein the fixed and movable rings are shaped to provide a space between them to accommodate the cams, each cam having opposed parallel flat sides spaced from one another less than the space between the rings and connected by the said curved portion of constant radius, each cam also having a curved portion of varying radius, opposite said curved portion of constant radius, whereby in one angular position the flat portions of the cams lie in spaced parallel relation to the surfaces of said rings and in other angular positions the curved cam portions of constant radius engage the fixed ring and the curved cam portions of varying radius engage the movable ring to shift the latter ring away from the fixed ring.

6. A combination as specified in claim 5, and wherein the axis of the cams is laterally displaced from intersecting relationship with the axis of the hollow spindle, each cam when rotated having the juncture of its curved portion of varying radius and the flat side facing the movable ring contact the movable ring at a region lying approximately in a plane containing the axis of the hollow spindle and the corresponding region of the movable ring engaged by the corresponding juncture on the other cam, and the combination further comprising means limiting the angular movement of the cams to prevent said junctures from reaching regions of the movable ring lying in a plane containing the axis of the cams and parallel to the axis of the spindle.

7. The combination specified in claim 2, and further comprising a fixed ring mounted on the spindle, a movable ring mounted on the spindle between the fixed ring and the projecting ends of the push rods, a housing having spaced bearings, one of said spaced bearings carrying the sleeve bearing, the other having the hollow spindle journalled therein adjacent the end thereof opposite the end mounting the gripping means, and a driving pulley secured to the sleeve bearing between the movable ring and the bearing of the housing in which the sleeve bearing is carried.

8. The combination specified in claim 2, and further comprising a fixed ring mounted on the spindle, a movable ring mounted on the spindle between the fixed ring and the projecting ends of the push rods, and a driving pulley secured to the spindle beyond the fixed ring and serving as a stop to prevent movement of the fixed ring in one direction along the spindle.

9. A combination comprising a spindle, a sleeve bearing secured to the spindle and having a flange at one end, a housing having spaced bearings, one of said spaced bearings journaling the said sleeve bearing, the end of the spindle away from the flange protruding from the housing beyond the other of said spaced bearings, said other of the spaced bearings journaling the spindle, a thrust collar keyed to the protruding end of the spindle and engaging the housing at said other of the spaced bearings, a fixed collar secured to the protruding end of the spindle beyond the thrust collar, and spring-urged elements protruding from the fixed collar and engaging the thrust collar so as to hold the flange on the sleeve bearing against the end of the housing at the said one of the spaced bearings.

10. In a chuck mechanism embodying a spindle supported for rotation and having a chuck mounted at one end thereof, and wherein said chuck has gripping elements normally urged to gripping positions by relatively movable chuck parts, one of which chuck parts is movable linearly relative to the other and resiliently biased in a direction to effect movements of the gripping elements to gripping positions, the combination therewith of fixed and linearly movable rings carried in adjacent relationship on the spindle, a collar mounted on the spindle and carrying push rods for linear movement, said push rods extending through the collar and engaging the said linearly movable ring and said one of the chuck parts and cam means disposed between the fixed and movable rings and movable into contact with said rings for effecting movements of the linearly movable ring, push rods and said one chuck part for effecting release of the gripping elements of the chuck against the biasing force exerted against said one of the chuck parts.

11. In a chuck mechanism as defined in claim 10, said one of the chuck parts having portions which are relatively adjustable for effecting a preliminary setting of the positions of the gripping elements, and said cam means providing for release of the gripping elements from gripping positions within a limited range from the positions determined by said preliminary setting.

12. In a chuck mechanism embodying a spindle supported for rotation and having a chuck mounted at one end thereof, and wherein said chuck has gripping elements and relatively movable chuck parts for supporting and actuating the gripping elements, one of which chuck parts is movable linearly relative to the other and resiliently biased in a direction to effect movements of the gripping elements to gripping positions, the combination therewith of fixed and linearly movable rings carried in adjacent relationship on the spindle and having opposed surfaces in spaced relationship to one another axially of the spindle, lever actuated cam means movably mounted between said opposed surfaces of the fixed and linearly movable rings, said cam means being normally out of engagement with the opposed surfaces of the rings and being movable about a fixed axis into engagement with the opposed ring surfaces for effecting movement of the linearly movable ring axially of the spindle, said cam means having flat faces of different widths in directions lateral to the axis of movement thereof and normally facing toward said opposed surfaces of the fixed and movable rings, the flat faces being joined at opposite sides by curved surfaces, the axis of movement of the cam means being offset from the axis of the spindle in a direction lateral to the axis of the spindle, stop means for limiting movement of the cam means to a position such that the flat faces and curved surfaces of the cam means cannot reach a stable position of engagement with the opposed surfaces of the fixed and movable rings, and means supported relative to the spindle for movements axially thereof to transmit movements of said linearly movable ring to the linearly movable chuck parts, thereby to effect movements of the gripping elements in response to movements of the lever actuated cam means.

13. In a chuck mechanism embodying a spindle supported for rotation and having a chuck mounted thereon, and wherein said chuck has gripping elements and a linearly movable chuck part for actuating the gripping elements between gripping and non-gripping positions, the combination therewith of a chuck operating mechanism for actuating said movable chuck part and including a fixed ring mounted on the spindle, a second ring mounted on the spindle between the fixed ring and the movable chuck part for movement axially of the spindle, said fixed ring and second ring having surfaces in spaced and opposed relationship, and cam means having opposed flat surface portions adjoined at peripherally spaced corners by opposed curved surface portions and disposed between the ring surfaces with the flat surface portions normally facing toward and spaced from said ring surfaces, said cam means being movable about a fixed axis and proportioned relative to the space between said ring surfaces so that one of the curved surface portions of the cam means engages the fixed ring while the second ring is engaged by one of the corners of the cam means upon movement of the cam means into contact with the ring surfaces to effect movement of the second ring relative to the fixed ring.

14. In a chuck mechanism as defined in claim 13, the axis of movement of said cam means being lateral to the axis of rotation of the spindle and spaced therefrom to an extent such that the corner of the cam means which engages the second ring upon movement of the cam means contacts that ring surface in a radial plane substantially coincident with the spindle axis.

15. In a chuck mechanism as defined in claim 12, said means supported relative to the spindle for movements axially thereof to transmit movements of said linearly movable ring to the linearly movable chuck part including a bearing sleeve connected to said movable chuck part and resiliently biased toward the movable ring, and said bearing sleeve being drivingly connected to the spindle.

16. In a chuck mechanism as defined in claim 15, said linearly movable chuck part being threaded into the end of the bearing sleeve and adjustable relative thereto for effecting a preliminary adjustment of the positions of the gripping elements.

References Cited in the file of this patent

UNITED STATES PATENTS

| | | |
|---|---|---|
| 647,115 | Redgate et al. | Apr. 10, 1900 |
| 1,299,258 | Strite | Apr. 1, 1919 |
| 2,467,569 | Walters | Apr. 19, 1949 |
| 2,479,973 | Scott et al. | Aug. 23, 1949 |
| 2,537,179 | Albertson et al. | Jan. 9, 1951 |